United States Patent
Oizumi

(10) Patent No.: US 8,517,069 B2
(45) Date of Patent: Aug. 27, 2013

(54) PNEUMATIC TIRE WITH TREAD HAVING SIPES, CIRCUMFERENTIAL MAIN GROOVES AND LATERAL GROOVES

(75) Inventor: Naoya Oizumi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 836 days.

(21) Appl. No.: 12/685,353

(22) Filed: Jan. 11, 2010

(65) Prior Publication Data

US 2010/0206446 A1 Aug. 19, 2010

(30) Foreign Application Priority Data

Feb. 16, 2009 (JP) ................... 2009-032932

(51) Int. Cl.
*B60C 11/117* (2006.01)
*B60C 11/12* (2006.01)
*B60C 11/13* (2006.01)

(52) U.S. Cl.
USPC ............ 152/209.17; 152/209.21; 152/209.24; 152/DIG. 3

(58) Field of Classification Search
USPC ............... 152/209.2, 209.15, 209.17, 209.18, 152/209.21, 209.24, DIG. 3; D12/551, 552, D12/553, 554, 555, 556
See application file for complete search history.

(56) References Cited

U.S. PATENT DOCUMENTS

| | | | | |
|---|---|---|---|---|
| 4,796,683 A | * | 1/1989 | Kawabata et al. | 152/209.24 |
| D491,129 S | * | 6/2004 | Maxwell | D12/553 |
| 6,823,911 B1 | * | 11/2004 | Himuro | 152/209.15 |
| D588,525 S | * | 3/2009 | Tanaka | D12/551 |
| D607,810 S | * | 1/2010 | Oizumi et al. | D12/552 |
| 2002/0062892 A1 | * | 5/2002 | Himuro | 152/209.18 |
| 2006/0090828 A1 | * | 5/2006 | Yamane | 152/209.18 |
| 2009/0107601 A1 | * | 4/2009 | Niknam et al. | 152/209.18 |
| 2009/0294003 A1 | * | 12/2009 | Horiuchi | 152/209.23 |
| 2010/0116392 A1 | * | 5/2010 | Yamakawa | 152/209.15 |
| 2010/0252159 A1 | * | 10/2010 | Mukai | 152/209.25 |

FOREIGN PATENT DOCUMENTS

| | | | |
|---|---|---|---|
| JP | 01-204805 A | * | 8/1989 |
| JP | 05-169918 A | * | 7/1993 |
| JP | 2003-146020 A | * | 5/2003 |
| JP | 2008-221955 A | | 9/2008 |

OTHER PUBLICATIONS

Machine translation for Japan 2003-146020 (no date).*

* cited by examiner

*Primary Examiner* — Steven D Maki
(74) *Attorney, Agent, or Firm* — Carrier Blackman & Associates, P.C.; William D. Blackman; Fulchand P. Shende

(57) ABSTRACT

Provided is a pneumatic tire having snow performances which are capable of being enhanced without sacrificing its running performance on dry road surfaces. A pneumatic tire of the invention includes two first main grooves, a plurality lateral grooves and a plurality of sipes in a tread part. In the pneumatic tire, a groove wall surface, of each first main groove, closer to a tire equatorial line is formed so as to cyclically repeat, in the tire circumferential direction, a change in an inclination angle of the groove wall surface to a direction normal to a tread, the change being a gradual increase from a minimum value of 0° to 15° to a maximum value of 15° to 45°. In places where the inclination angel of the groove wall surface, of the first main groove, closer to the tire equatorial line, is at its maximum, no lateral grooves communicate with the first main groove, and in the places, the other groove wall surface, of the first main groove, closer to a corresponding contact end extends uninterruptedly.

16 Claims, 4 Drawing Sheets

PNEUMATIC TIRE WITH TREAD HAVING SIPES, CIRCUMFERENTIAL MAIN GROOVES AND LATERAL GROOVES

BACKGROUND OF THE INVENTION

1. Field of the Invention

The present invention relates to a pneumatic tire suitable as a tire for an iced or snow-covered road, and specifically to a pneumatic tire having snow performances enhanced without sacrificing its running performance exhibited on dry road surfaces.

2. Description of the Related Art

Proposals have been made on a pneumatic tire, as a tire for an iced or snow-covered road, whose tread part includes: multiple main grooves extending in a tire circumferential direction; multiple lateral grooves extending in a tire width direction; and multiple sipes formed in each of land sections into which the tread part is partitioned by the multiple main grooves and the multiple lateral grooves (see Japanese patent application Kokai publication No. Hei. 2008-221955, for instance).

Such a pneumatic tire aims at securing its snow performances on the basis of an edge effect of each of the grooves and sipes. To this end, the grooves and sipes are increased in number, and the total edge length is increased. This makes it possible to enhance the snow performances. However, the increase of the grooves and sipes in number causes a decrease in the total area of the land sections, in turn deteriorating the rigidity of the tread part. As a result, the running performance particularly on dry road surfaces is degraded.

SUMMARY OF THE INVENTION

An object of the present invention is to provide a pneumatic tire having the snow performances which are capable of being enhanced without sacrificing the running performance exhibited on dry road surfaces.

A pneumatic tire according to an aspect of the present invention to achieve the above object includes: two first main grooves extending in a tire circumferential direction, the two first main grooves being placed in a central area in three areas obtained by equally dividing a contact width of a tread part into three; a plurality lateral grooves extending in a tire width direction from either tire-widthwise contact end to the central area, the plurality of lateral grooves being placed in the tread part; and a plurality of sipes formed in each of land sections defined in the tread part by the first main grooves and the lateral grooves. In the pneumatic tire, a groove wall surface, of each first main groove, closer to a tire equatorial line is formed so as to cyclically repeat, in the tire circumferential direction, a change in an inclination angle of the groove wall surface to a direction normal to a tread, the change being a gradual increase from a minimum value of 0° to 15° to a maximum value of 15° to 45°. In places where the inclination angel of the groove wall surface, of the first main groove, closer to the tire equatorial line, is at its maximum, no lateral grooves communicate with the first main groove, and in the places, a groove wall surface, of the first main groove, closer to a corresponding contact end extends uninterruptedly.

In the present invention, in each first main groove located in the central area, the groove wall surface is designed so that: the inclination angle of the groove wall surface closer to the tire equatorial line is gradually increased in the tire circumferential direction; and such a change in the inclination angle is cyclically repeated. For this reason, once the tread part packs down snow, the two groove wall surfaces of each first main groove, which become progressively closer to each other in the depth direction of the main groove, compresses the snow into a hard snow column. This increases the snow column shearing force, and accordingly makes it possible to enhance the snow performances. In addition, the enhancement of the snow performances is achieved rather than on the basis of the total edge length of the grooves and sipes. For this reason, the running performance on dry road surfaces is not sacrificed.

In the aspect of the present invention, it is preferable that, in each main groove, a plurality of stripe portions each formed by any one of a protrusion and a dent be formed in the groove wall surface closer to the tire equatorial line, each stripe portion inclining from the a tread surface side to a groove bottom side in a direction in which the inclination angle of the groove wall surface increases and that an inclination angle of each stripe portion to the tire circumferential direction be set in a range of 20° to 70°. In each main groove, such stripe portions work on snow so as to guide the snow toward places where the inclination angle of the groove wall surface closer to the tire equatorial line is larger. For this reason, the stripe portions make the snow column harder, and accordingly enable the pneumatic tire to acquire a larger snow column shearing force. Furthermore, an edge effect of each stripe portion itself contributes to the enhancing of the snow performances.

It is preferable that, in each first main groove, an inclination angle of the groove wall surface closer to its corresponding contact end be set relatively small in a portion thereof facing a portion, having a relatively large inclination angle, of the groove wall surface closer to the tire equatorial line, whereas the inclination angle of the groove wall surface closer to its corresponding contact end be set relatively large in a portion thereof facing a portion in a place, having a relatively small inclination angle, of the groove wall surface closer to the tire equatorial line. Because in each first main groove, as described above, not only the inclination angle of the groove wall surface closer to the tire equatorial line but also the inclination angle of the groove wall surface closer to the contact end are adjusted, each first main groove as a whole is capable of forming the hard snow column, and is accordingly capable of enhancing the snow performances.

It is preferable that, in a land section sandwiched between the first main grooves, notch grooves extending in the tire width direction be formed at places where, in each first main groove, the inclination angel of the groove wall surface closer to the tire equatorial line is at its minimum. The forming of the notch grooves in the land section in the central area enhances the braking and traction performances in a tire travelling direction, while the above-described optimization of the inclination angles of the respective groove wall surfaces of each first main groove mainly contributes to the enhancing of the snow performances which the pneumatic tire should exhibit while the vehicle is turning.

It is preferable that, in the pneumatic tire for which a rotational direction is specified, the inclination angle of the groove wall surface, in each main groove, closer to the tire equatorial line be gradually increased in a direction opposite to the rotational direction. When each first main groove is designed to become gradually narrower in the direction opposite to the rotational direction in this manner, the first main groove is capable of effectively compressing the snow into the first main groove in response to the rotation of the pneumatic tire, and is accordingly capable of forming a harder snow column.

At least one second main groove extending in the tire circumferential direction can be formed in each of outer areas respectively located at two sides of the central area. Here, in the pneumatic tire for which the rotational direction is specified, it is preferable that a portion sandwiched between each two neighboring lateral grooves in the second main groove be inclined to a nearby contact end while extending in the direction opposite to the rotational direction. When the portion of each second main groove sandwiched between each two neighboring lateral grooves is inclined toward the contact end while extending in the direction opposite to the rotational direction in this manner, it is possible to increase the substantial length of each lateral groove, and accordingly to enhance the snow performances.

For the present invention, the contact width is defined as a tire-widthwise dimension of a contact area which is formed by a tire, which is filled with a maximum air pressure stipulated by the tire specification, when 80% of the maximum load carrying capability is imposed on the tire while the tire is being placed on a flat surface in order for the tread part to contact the flat surface. The tire-widthwise contact ends are defined as the outermost tire-widthwise positions of the contact area.

DETAILED DESCRIPTION OF THE PREFERRED EMBODIMENT

Figure 1:
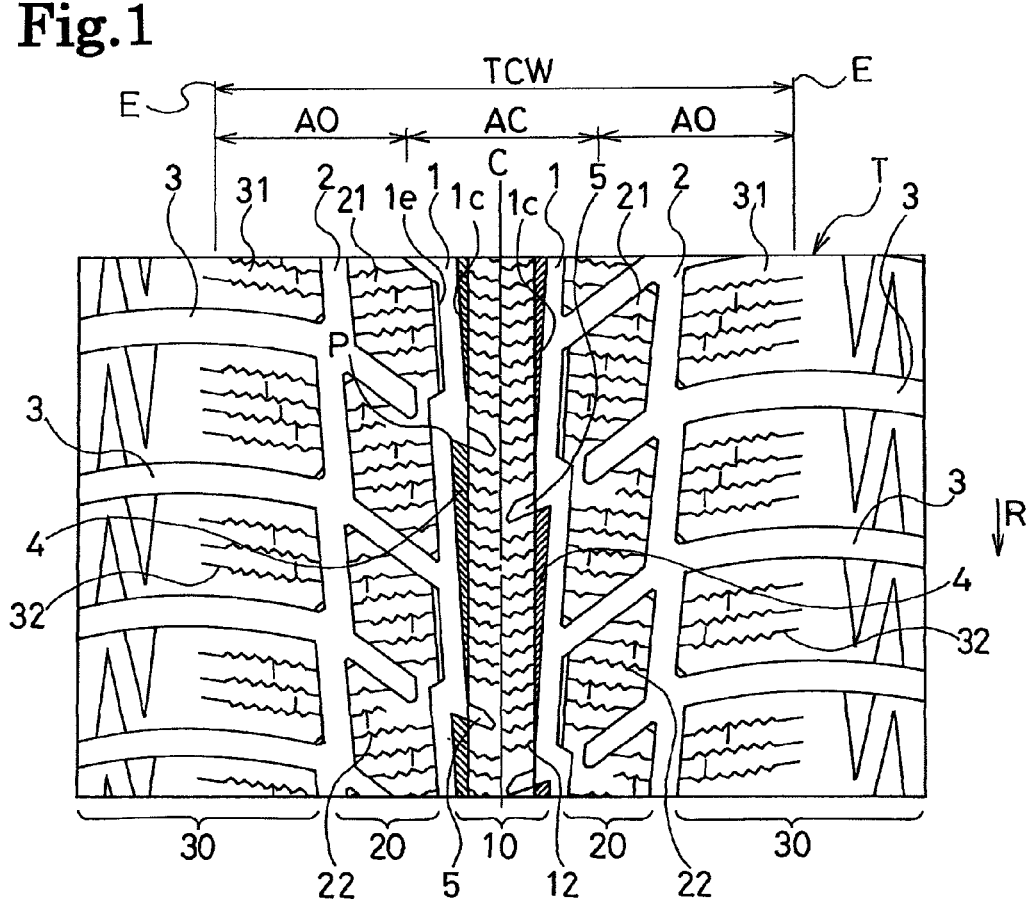
FIG. 1 is a development view showing a tread pattern of a pneumatic tire according to an embodiment of the present invention.

Detailed descriptions will be hereinbelow provided for a configuration of the present invention, referring to the attached drawings. FIG. 1 shows a tread pattern of a pneumatic tire according to an embodiment of the present invention. As shown in FIG. 1, three areas obtained by equally dividing a contact width TCW of a tread part T into three are defined as: a central area AC located in the middle; and outer areas AO located on the two sides of the central area AC. In addition, a rotational direction R is specified for the pneumatic tire according to the present embodiment.

As shown in FIG. 1, the tread part T includes: two main grooves (first grooves) 1, 1 which are located in the central area AC, and which extend in a tire circumferential direction; two main grooves (second grooves) 2, 2 which are located in the respective outer areas AO, and which extend in the tire circumferential direction; and multiple lateral grooves 3 extending in a tire width direction from either of the tire-widthwise contact ends E to the central area AC. The lateral grooves 3 are placed at predetermined intervals in the tire circumferential direction. Each lateral groove 3 inclines from a tire equatorial line C toward either widthwise outside of the tire in a direction opposite to the rotational direction R. The lateral grooves 3 include: lateral grooves 3 communicating with either main groove 1 in the central area AC; and lateral grooves 3 communicating with neither main groove 1 in the central area AC. The communicating lateral grooves 3 and the uncommunicating lateral grooves 3 are alternately placed in the tire circumferential direction. Thereby, a land section 10 continuously extending in the tire circumferential direction is defined between the two main grooves 1, 1; land sections 20 each constituted of multiple blocks 21 are defined between the main grooves 1 and the nearby main grooves 2, respectively; and land sections 30 each consisting of multiple blocks 31 are defined in outer sides beyond the main grooves 2 in the tire width direction, respectively.

Multiple sipes 12 are provided in the land section 10; multiple sipes 22 are provided in each land section 20; and multiple sipes 32 are provided in each land section 30. The sipes 12, 22, 32 are zigzagged in a plan view. A branch extending in the tire circumferential direction is formed in some of the sipes 12, 22, 32. No specific restriction is imposed on the plan-view shapes of the sipes 12, 22, 32. In addition, the sipes 12, 22, 32 may have their respective three-dimensional structures in which the sipes 12, 22, 32 undulate in their sipe thickness directions in axially inner portions of the tire under the tread surface.

In the foregoing pneumatic tire, in each main groove 1, a groove wall surface 1c closer to the tire equatorial line C is formed to cyclically repeat a change, in the tire circumferential direction, in the inclination angle of the groove wall surface 1c to a direction normal to the tread. In the change, the inclination angle gradually increases from a minimum value of 0° to 15° (preferably 0° to 10°) to a maximum value of 15° to 45° (preferably 20° to 45°). In each main groove 1, the change in the inclination angle of the groove wall surface 1c closer to the tire equatorial line C is cyclically repeated at regular intervals of two lateral grooves 3. In this respect, if the minimum value of the inclination angle of the groove wall surface 1c closer to the tire equatorial line C is too large in each main groove 1, the volume of each main groove 1 becomes smaller, and the running performance on wet road surfaces is degraded accordingly. If the maximum value of the inclination angle of the groove wall surface 1c closer to the tire equatorial line C is too small in each main groove 1, an effect of packing down snow becomes insufficient.

Meanwhile, in each main groove 1, in places P where the inclination angle of the groove surface 1c closer to the tire equatorial line C is at its maximum, the lateral grooves 3 are designed to communicate with neither main groove 1. Thereby, in each main groove 1, a groove wall surface 1e closer to a corresponding one of the contact ends E extends with no interruption in the places P. In particular, in each main groove 1, the lateral grooves 3 are designed to have no opening portion, within 15 mm of any place P where the inclination angle of the groove wall surface 1c closer to the tire equatorial line C is at its maximum, on the two sides of the place P in the tire circumferential direction.

In the foregoing pneumatic tire, in each of the main groove 1 located in the central area AC, the groove wall surface 1c closer to the tire equatorial line C is designed to cyclically repeat the change in which the inclination angle of the groove wall surface 1c is gradually increased, in the tire circumferential direction. For this reason, once the tread part T packs down snow on a snow-covered road surface, the two groove wall surfaces $1c$, $1e$ of each main groove 1, which become progressively closer to each other in the depth direction of the main groove 1, compresses the snow into a hard snow column. This increases the snow column shearing force, and accordingly makes it possible to enhance the snow performances. In addition, unlike in the any conventional pneumatic tire, the enhancement of the snow performances is achieved rather than on the basis of the total edge length of the grooves and sipes. For this reason, the running performance on dry road surfaces is not sacrificed.

In particular, in the places P where the inclination angel of the groove wall surface $1c$ of each first main groove 1, which is closer to the tire equatorial line C, is at its maximum, no lateral grooves 3 are designed to communicate with the first main groove 1; and in the places P, the other groove wall surface $1e$ of the first main groove 1, which is closer to the corresponding contact end E, is designed to uninterruptedly extend. For this reason, while the snow column is being compressed, it is possible to prevent the snow from running out of the first main grooves 1, and accordingly to facilitate the formation of a harder snow column. Note that: in each main groove 1, the change in the inclination angle of the groove wall surface $1c$ closer to the tire equatorial line C is designed to be cyclically repeated at regular intervals corresponding to two lateral grooves 2; some of the lateral grooves 3 are designed to communicate with neither main groove 1 in the central area AC; and the others of the lateral grooves 3 are designed to communicate with either main groove 1 in the central area AC. This enables the pneumatic tire to secure its drainage, and accordingly to fully exert its running performance on wet road surfaces.

In addition, the groove wall surfaces $1c$, of each of the main grooves 1, closer to the tire equatorial line C are specified as described above, and the main grooves 1 are placed in the central area AC. Because the above-described inclined structure is adopted for the main grooves 1 each with a relatively long footprint length in the central area AC, it is possible to enhance the snow performances effectively.

Figure 2:
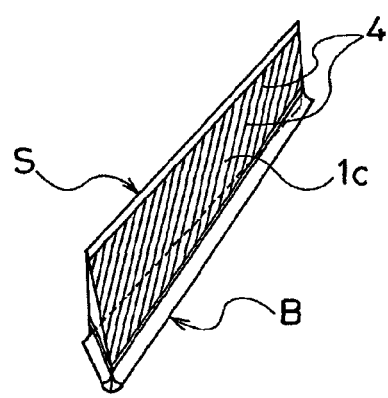
FIG. 2 is a perspective view showing a groove wall surface which is extracted from one of main grooves located in a central area of the tread pattern shown in FIG. 1.
Figure 3:
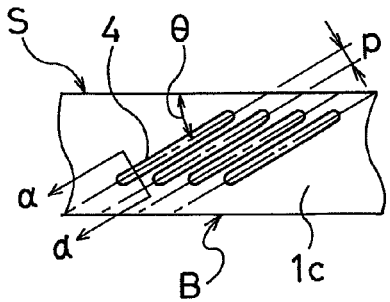
FIG. 3 is a side view showing the groove wall surface which is extracted from the main groove located in the central area of the tread pattern shown in FIG. 1.
Figure 4:
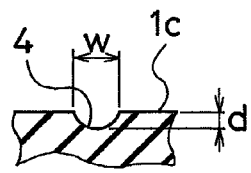
FIG. 4 is an auxiliary cross-sectional view of the groove wall surface taken along the α-α line of FIG. 3.

FIG. 2 is a perspective view showing a groove wall surface which is extracted from one of the main grooves 1 located in the central area AC of the tread pattern shown in FIG. 1. FIG. 3 is a side view showing the groove wall surface $1c$ which is extracted from the main groove 1 located in the central area AC of the tread pattern shown in FIG. 1. FIG. 4 is an auxiliary cross-sectional view of the groove wall surface $1c$ taken along the $\alpha$-$\alpha$ line of FIG. 3. As shown in FIGS. 2 to 4, in each main groove 1, multiple stripe portions 4 respectively formed by protrusions or dents are formed in the groove wall surface $1c$ closer to the tire equatorial line C. Each protrusion or dent inclines from a side of the tread surface S to a side of the groove bottom B in a direction in which the inclination angle of the groove wall surface $1c$ becomes larger. An inclination angle $\theta$ of each stripe portion 4 to the tire circumferential direction is set in a range of 20° to 70°.

In each main groove 1, such stripe portions 4 work on snow so as to guide the snow toward places where the inclination angle of the groove wall surface $1c$ closer to the tire equatorial line C is larger. This makes the snow column harder, and accordingly enables the pneumatic tire to acquire a larger snow column shearing force. Furthermore, an edge effect of each stripe portion 4 itself contributes to the enhancing of the snow performances. In this respect, when the inclination angle $\theta$ is out of the above-mentioned range, the effect of guiding snow, which is squeezed in each main groove 1, in the predetermined direction is insufficient, and the edge effect of each stripe portion 4 is insufficient as well.

FIGS. 2 to 4 sketch stripe portions 4 formed by dents. In this case, it is desirable that: their depth d should be 0.1 mm to 0.8 mm; their width w should be 0.3 mm to 1.2 mm; and the pitch p between each neighboring two of them should be 0.5 mm to 2.0 mm. When the stripe portions 4 formed by dents satisfy the dimensional requirement, the stripe portions 4 are capable of guiding snow, which is squeezed in the corresponding main groove 1, to the predetermined direction, and are concurrently capable of exerting their better edge effect. In the case where the stripe portions 4 are formed by protrusions, similarly, it is desirable that: their height should be 0.1 mm to 0.8 mm; their width should be 0.3 mm to 1.2 mm; and the pitch between each neighboring two of them should be 0.5 mm to 2.0 mm.

Figure 5:
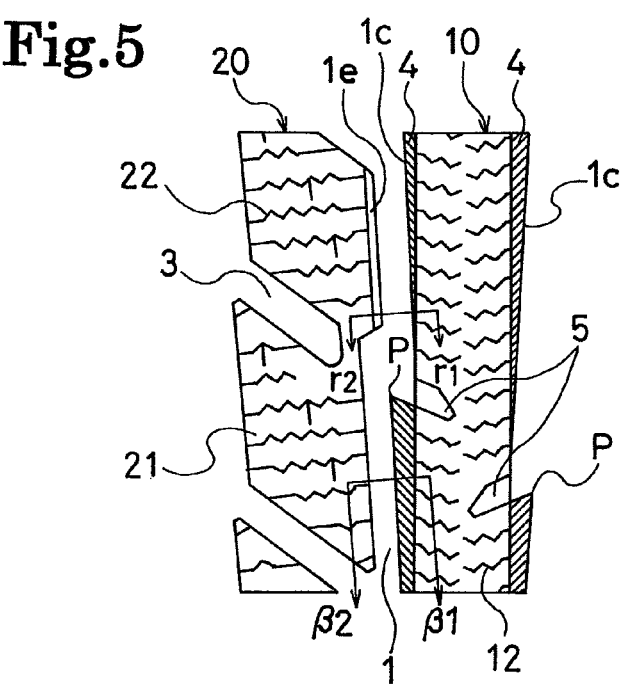
FIG. 5 is a magnified view showing a chief section of the tread pattern shown in FIG. 1.
Figure 6:
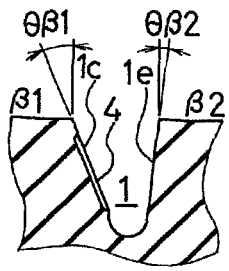
FIG. 6 is an auxiliary cross-sectional view showing the chief section of the tread pattern taken along the β1-β2 line of FIG. 5.
Figure 7:
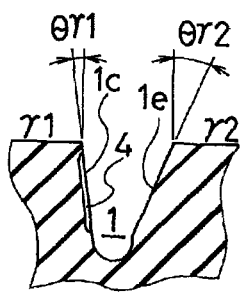
FIG. 7 is an auxiliary cross-sectional view showing the chief section of the tread pattern taken along the γ1-γ2 line of FIG. 5.

FIG. 5 is a magnified view showing a chief section of the tread pattern shown in FIG. 1. FIG. 6 is an auxiliary cross-sectional view showing the chief section of the tread pattern taken along the $\beta1$-$\beta2$ line of FIG. 5. FIG. 7 is an auxiliary cross-sectional view showing the chief section of the tread pattern taken along the $\gamma1$-$\gamma2$ line of FIG. 5. In each main groove 1, as shown in FIGS. 5 to 7, the inclination angle of the groove wall surface $1e$ closer to its corresponding contact end E is relatively small in a portion thereof facing a portion, having a relatively large inclination angle, of the groove wall surface $1c$ closer to the tire equatorial line C is relatively large, whereas the inclination angle of the groove wall surface $1e$ closer to its corresponding contact end E is relatively large in a portion thereof facing a portion, having a relatively small inclination angle, of the groove wall surface $1c$ closer to the tire equatorial line C.

To put it specifically, a relation between an inclination angle $\theta\beta1$ of the groove wall surface $1c$ on the $\beta1$ to $\beta2$ line and an inclination angle $\theta\gamma1$ of the groove wall surface $1c$ on the $\gamma1$ to $\gamma2$ line is $\theta\beta1>\theta\gamma1$, whereas a relation between an inclination angle $\theta\beta2$ of the groove wall surface $1e$ on the $\beta1$ to $\beta2$ line and an inclination angle $\theta\gamma2$ of the groove wall surface $1e$ on the $\gamma1$ to $\gamma2$ line is $\theta\beta2<\theta\gamma2$. Note that the present invention defines the inclination angle of each groove wall surface as being measured against the background of a cross section, of the groove, orthogonal to a contour of the groove bottom.

Because in each main groove 1, as described above, not only the inclination angle of the groove wall surface $1c$ closer to the tire equatorial line C but also the inclination angle of the groove wall surface $1e$ closer to the contact end E are adjusted, the first main groove 1 as a whole is capable of forming the hard snow column, and is accordingly capable of enhancing the snow performances. Note that, in each main groove 1, the inclination angle of the groove wall surface $1e$ closer to the contact end E may be changed stepwise as illustrated, or may be changed gradually like the inclination angle of the groove wall surface $1c$ closer to the tire equatorial line C.

It is desirable that the above-described angle setting should satisfy a relation of $10°\leqq\theta\beta1+\theta\beta2\leqq50°$ and $10°\leqq\theta\gamma1+\theta\gamma2\leqq50°$. In other words, it is desirable that, at any places in each first main groove, a total of the inclination angles of portions facing each other of the two groove wall surfaces $1c$, $1e$ be set at 10° to 50°. If $\theta\beta1+\theta\beta2$ or $\theta\gamma1+\theta\gamma2$ is less than 10°, the strength of the snow column formed in each main groove 1 is insufficient. By contrast, if $\theta\beta1+\theta\beta2$ or $\theta\gamma1+\theta\gamma2$ exceeds 50°, the driving performance on wet road surfaces is reduced due to the decreased volume of each main groove 1.

As shown in FIG. 1, in the land section 10 sandwiched between the main grooves 1, 1, notch grooves 5 extending in the tire width direction are respectively formed at places where, in each main groove 1, the inclination angle of each groove wall surface 1c closer to the equatorial line C is at its minimum. These notch grooves 5 may lie across the land section 10. Otherwise, the notch grooves 5 may be terminated in the land section 10 without dividing the land section 10 into smaller sections. In a case where the notch grooves 5 are designed not to lie across the land section 10, the pneumatic tire is capable of exerting the on-ice performances which are enhanced by minimizing the reduction in the rigidity of the land section 10 located in the central area AC.

The forming of the notch grooves 5 in the land section 10 in the central area AC makes it possible to enhance the braking and traction performances in a tire travelling direction, while the above-described optimization of the inclination angles of the respective groove wall surfaces 1c, 1e of each first main groove 1 located in the central area AC mainly contributes to the enhancing of the snow performances while the vehicle is being turning. Thereby, it is possible for the pneumatic tire to simultaneously satisfy the snow performance which should be exhibited while the vehicle is turning, the braking performance which should be exhibited on snow-covered road surfaces, as well as the traction performance. In addition, because the notch grooves 5 are arranged in the places where, in each main groove 1, the inclination angle of the groove wall surfaces 1c closer to the tire equatorial line C is at its minimum, the notch grooves 5 do not degrade the effect which is based on the inclined structure of the groove wall surfaces 1c, 1e of each main groove 1.

The above-described pneumatic tire has the tread pattern which is basically symmetrical with respect the tire equatorial line C. Its rotational direction R is specified. In each main groove 1, the inclination angle of the groove wall surface 1c closer to the tire equatorial line C is designed to gradually increase in a direction opposite to the rotational direction R. Because each main groove 1 is designed to become gradually narrower in the direction opposite to the rotational direction R in this manner, the main groove 1 is capable of effectively compressing the snow into the main groove 1, and is accordingly capable of forming a harder snow column.

In the pneumatic tire for which the rotational direction R is specified, it is desirable that, in each outer area AO, a portion of the main groove 2 sandwiched between each two neighboring lateral grooves 3, 3 should be inclined toward the contact end E while extending in the direction opposite to the rotational direction R. When the portion of the main groove 2 sandwiched between each two neighboring lateral grooves 3, 3 is inclined toward the contact end E while extending in the direction opposite to the rotational direction R in this manner, it is possible to increase the substantial length of each lateral groove 3, and accordingly to enhance the snow performances. For this reason, it is possible to effectively enhance the snow performances by employing the characteristic of the directional tread pattern.

Note that, although the foregoing embodiment has been described as the pneumatic tire for which the rotational direction is specified, the present invention can also be applied to a pneumatic tire (see FIG. 8) which has a basically point-symmetrical tread pattern, and for which no rotational direction is specified.

The foregoing descriptions have been provided for the preferable embodiments of the present invention. Nevertheless, it should be understood that various modifications, substitutions and replacements can be applied to the present invention as long as the modifications, substitutions and replacements do not depart from the spirit or scope of the present invention as defined in the appended claims.

EXAMPLES

Pneumatic tires according to a conventional example and examples 1 to 6 were made in accordance with the following specifications. The tire size was 175/65R14. Each pneumatic tire included: two first main grooves extending in the tire circumferential direction, the two first main grooves being placed in the central area among the three areas into which the tread part is equally divided; one second main groove extending in the tire circumferential direction, the one second main groove being in each of the outer areas located at the two sides of the central area; multiple lateral grooves extending in the tire width direction from either tire-widthwise contact end to the central area, the multiple lateral grooves being placed in the tread part; and multiple sipes placed in each of the land sections defined in the tread part by the main grooves and the lateral grooves. For each pneumatic tire, the specific configuration of the tread part was set up as shown in Table 1.

Figure 8:
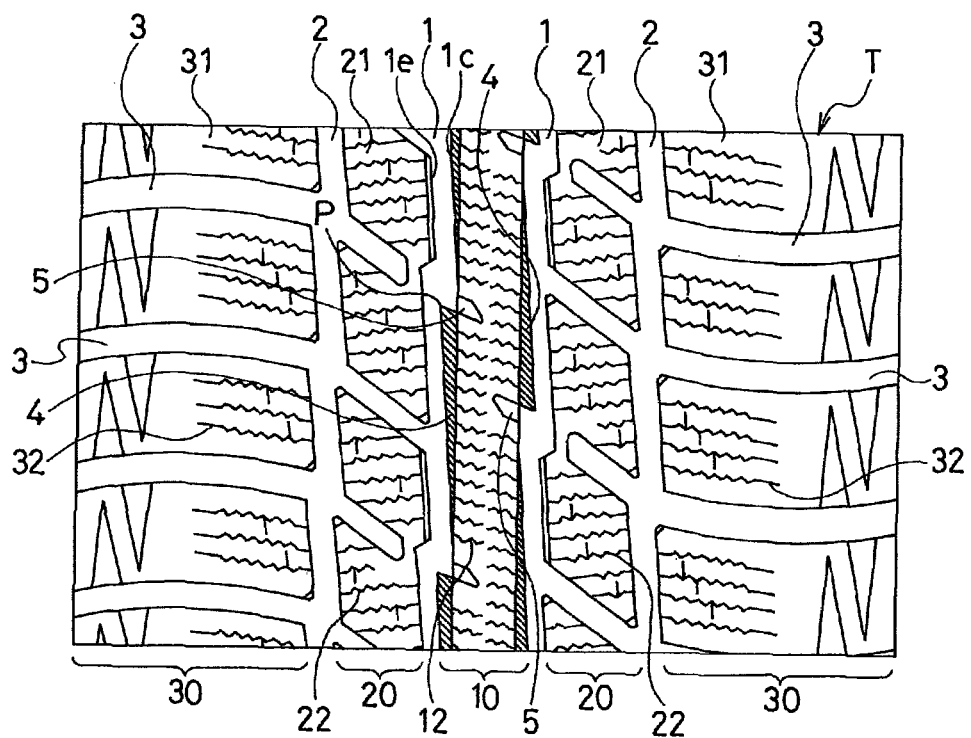
FIG. 8 is a development view showing a tread pattern of a pneumatic tire according to another embodiment of the present invention.
Figure 9:
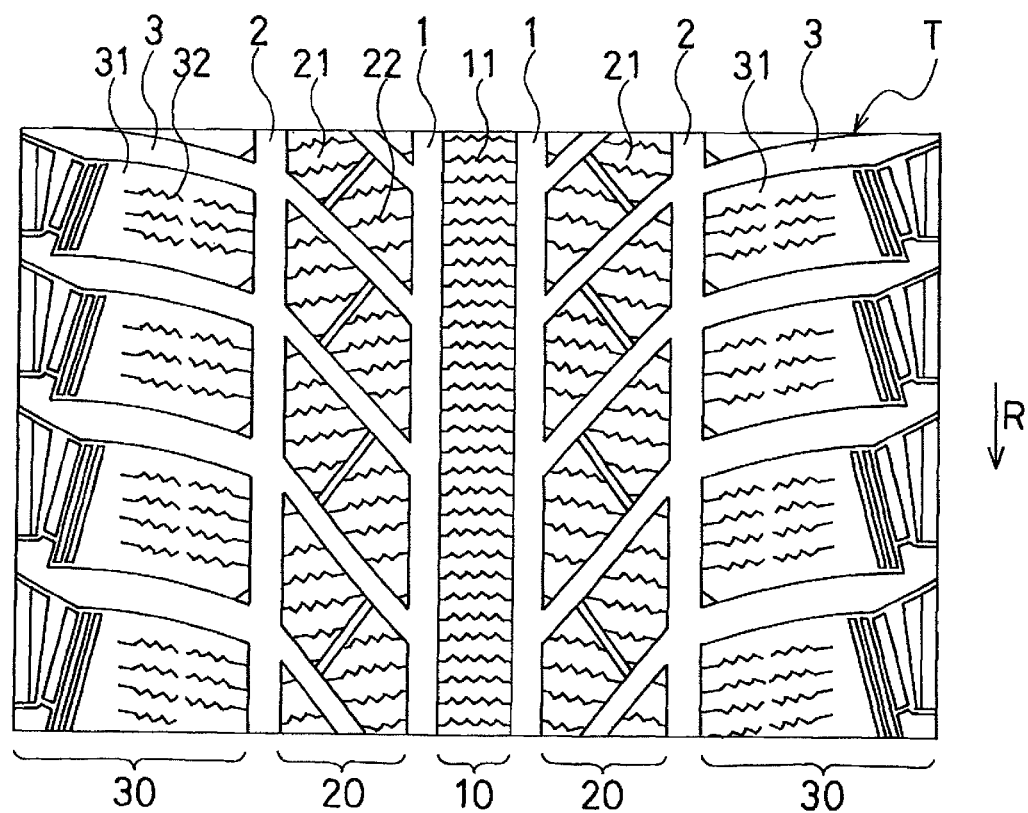
FIG. 9 is a development view showing an example of a conventional pneumatic tire.

The conventional example was a tire having a tread pattern which is shown in FIG. 9. Examples 1 to 4 were tires each having a basically point-symmetrical tread pattern as shown in FIG. 8. Examples 5 and 6 were tires each having the basically line-symmetrical tread pattern as shown in FIG. 1.

In FIG. 1, with regard to each main groove in the central area, "Inclination Angle of Groove Wall Surface Closer to Tire Equator" means an inclination angle, of the groove wall surface closer to the tire equator, to a direction normal to the tread; "Inclination Angle of Each Stripe Portion" means an inclination angle of each stripe portion to the tire circumferential direction; and "Total of Inclination Angles of Two Groove Wall Surfaces" means a total of the inclination angles of portions facing each other of the two groove wall surfaces.

For these tires, the turning performance on snow-covered road surfaces, the braking performance on snow-covered road surfaces and the driving stability on dry road surfaces were evaluated in accordance with the following evaluation method. The result of the evaluation is shown in Table 1.

Turning Performance on Snow-Covered Road Surfaces:

For each example, the test tires were mounted on the respective wheels each with a rim size of 14×5½J, and were thus attached to a vehicle (FF vehicle; FF stands for front-engine, front-wheel drive) with a 1300 cc engine. The air pressure of each test tire was set at 210 kPa. For each example, the vehicle made circular turns with a radius of 18 m on a snow-covered road surface, and thereby an average time needed for the vehicle to make a single circular turn was measured. For each example, the evaluation result was shown by use of an index number which indicates the inverse number of its measured value as compared with the inverse number of the measured value for the conventional example which was taken as 100. A larger index number means a better turning performance on snow-covered road surfaces.

Braking Performance on Snow-Covered Road Surfaces:

For each example, the test tires were mounted on the respective wheels each with a rim size of 14×5½J, and were thus attached to the vehicle (FF vehicle) with the 1300 cc engine. The air pressure of each test tire was set at 210 kPa. For each example, the vehicle was braked by use of an anti-lock braking system (ABS) when running on a snow-covered road surface at a speed of 40 km/h, and thereby the braking distance was measured. For each example, the evaluation result was shown by use of an index number which indicates the inverse number of its measured value as compared with the inverse number of the measured value for the conventional example which was taken as 100. A larger index number means a better braking performance on snow-covered road surfaces.

Driving Stability on Dry Road Surfaces:

For each example, the test tires were mounted on the respective wheels each with a rim size of 14×5½J, and were thus attached to the vehicle (FF vehicle) with the 1300 cc engine. The air pressure of each test tire was set at 210 kPa. For each example, a sensory evaluation was conducted by the test driver on a dry road surface. For each example, the evaluation result was shown by use of an index number as compared with the conventional example which was taken as 100. A larger index number means a better driving stability on dry road surfaces.

TABLE 1

|  |  | Conventional Example | Example 1 | Example 2 | Example 3 | Example 4 | Example 5 | Example 6 |
|---|---|---|---|---|---|---|---|---|
| Main groove in central area | Change in inclination angle of groove wall surface closer to tire equator | Absent | Present 2°-35° | Present 2°-35° | Present 2°-35° | Present 2°-35° | Present 2°-35° | Present 2°-35° |
|  | Presence/absence of stripe portion and its inclination angle | Absent | Absent | Present 30° | Present 30° | Present 30° | Present 30° | Present 30° |
|  | Total of inclination angles of both groove wall surfaces | 8° | 5°-38° | 5°-38° | 18°-38° | 18°-38° | 18°-38° | 18°-38° |
| Land section in central area | Presence/absence of notch groove | Absent | Absent | Absent | Absent | Present | Present | Present |
| Tread pattern | Basic pattern type | Line-symmetrical | Point-symmetrical | Point-symmetrical | Point-symmetrical | Point-symmetrical | Line-symmetrical | Line-symmetrical |
| Main groove in outer area | Presence/absence of inclination | Absent | Absent | Absent | Absent | Absent | Absent | Present |
| Snow performances | Turning performance on snow | 100 | 105 | 107 | 110 | 112 | 117 | 117 |
|  | Braking performance on snow | 100 | 103 | 105 | 107 | 112 | 115 | 117 |
| Running performance on dry road | Driving stability | 100 | 103 | 103 | 105 | 105 | 105 | 105 |

As clear from Table 1, the tires according to examples 1 to 6 were all better in the snow performances (the turning performance on snow-covered road surfaces, and the braking performance on snow-covered road surfaces) as well as the performance on dry road surfaces (the driving stability on dry road surfaces) than the tire according to the conventional example.

What is claimed is:

1. A pneumatic tire including: two first main grooves extending in a tire circumferential direction, the two first main grooves being placed in a central area in three areas obtained by equally dividing a contact width of a tread part into three; a plurality of lateral grooves extending in a tire width direction from either tire-widthwise contact end to the central area, the plurality of lateral grooves being placed in the tread part; and a plurality of sipes formed in each of land sections defined in the tread part by the first main grooves and the lateral grooves, wherein
   a groove wall surface, of each first main groove, closer to a tire equatorial line is formed so as to cyclically repeat, in the tire circumferential direction, a change in an inclination angle of the groove wall surface to a direction normal to a tread surface of the tire, the change being a gradual increase from a minimum value of 0° to 15° to a maximum value of 15° to 45°,
   the lateral grooves include first lateral grooves communicating with either of said two first main grooves, and second lateral grooves communicating with neither of said two first main grooves, which are alternately placed in the tire circumferential direction,
   in places where the inclination angle of the groove wall surface, of the first main groove, closer to the tire equatorial line, is at its maximum, none of said lateral grooves communicates with the first main groove, and
   in the places, a groove wall surface, of the first main groove, closer to a corresponding contact end extends uninterruptedly.

2. The pneumatic tire according to claim 1, wherein
   in each main groove, a plurality of stripe portions each formed by any one of a protrusion and a dent are formed in the groove wall surface closer to the tire equatorial line, each stripe portion inclining from a tread surface side to a groove bottom side in a direction in which the inclination angle of the groove wall surface increases, and
   an inclination angle of each stripe portion to the tire circumferential direction is set in a range of 20° to 70°.

3. The pneumatic tire according to claim 2, wherein
   in a land section sandwiched between the first main grooves, notch grooves extending in the tire width direction are formed at places where, in each first main groove, the inclination angle of the groove wall surface closer to the tire equatorial line is at its minimum.

4. The pneumatic tire according to claim 3, wherein
   the notch grooves are terminated in the land section sandwiched between the first main grooves without dividing the land section.

5. The pneumatic tire according to claim 2, wherein
   a rotational direction is specified for the pneumatic tire, and
   in each main groove, the inclination angle of the groove wall surface closer to the tire equatorial line is gradually increased in a direction opposite to the rotational direction.

6. The pneumatic tire according to claim 5, wherein
   at least one second main groove extending in the tire circumferential direction is formed in each of outer areas respectively located at two sides of the central area, and
   a portion sandwiched between each two neighboring lateral grooves in the second main groove is inclined to a nearby contact end while extending in the direction opposite to the rotational direction.

7. The pneumatic tire according to claim 1, wherein in each first main groove, an inclination angle of the groove wall surface closer to its corresponding contact end is set relatively small in a portion thereof facing a portion, having a relatively large inclination angle, of the groove wall surface closer to the tire equatorial line, whereas the inclination angle of the groove wall surface closer to its corresponding contact end is set relatively large in a portion thereof facing a portion in a place, having a relatively small inclination angle, of the groove wall surface closer to the tire equatorial line.

8. The pneumatic tire according to claim 7, wherein at any places in each first main groove, a total of the inclination angles of portions facing each other of the two groove wall surfaces is set at 10° to 50°.

9. The pneumatic tire according to claim 7, wherein in a land section sandwiched between the first main grooves, notch grooves extending in the tire width direction are formed at places where, in each first main groove, the inclination angle of the groove wall surface closer to the tire equatorial line is at its minimum.

10. The pneumatic tire according to claim 9, wherein the notch grooves are terminated in the land section sandwiched between the first main grooves without dividing the land section.

11. The pneumatic tire according to claim 7, wherein a rotational direction is specified for the pneumatic tire, and in each main groove, the inclination angle of the groove wall surface closer to the tire equatorial line is gradually increased in a direction opposite to the rotational direction.

12. The pneumatic tire according to claim 11, wherein at least one second main groove extending in the tire circumferential direction is formed in each of outer areas respectively located at two sides of the central area, and a portion sandwiched between each two neighboring lateral grooves in the second main groove is inclined to a nearby contact end while extending in the direction opposite to the rotational direction.

13. The pneumatic tire according to claim 1, wherein in a land section sandwiched between the first main grooves, notch grooves extending in the tire width direction are formed at places where, in each first main groove, the inclination angle of the groove wall surface closer to the tire equatorial line is at its minimum.

14. The pneumatic tire according to claim 13, wherein the notch grooves are terminated in the land section sandwiched between the first main grooves without dividing the land section.

15. The pneumatic tire according to claim 1, wherein a rotational direction is specified for the pneumatic tire, and in each main groove, the inclination angle of the groove wall surface closer to the tire equatorial line is gradually increased in a direction opposite to the rotational direction.

16. The pneumatic tire according to claim 15, wherein at least one second main groove extending in the tire circumferential direction is formed in each of outer areas respectively located at two sides of the central area, and a portion sandwiched between each two neighboring lateral grooves in the second main groove is inclined to a nearby contact end while extending in the direction opposite to the rotational direction.

* * * * *